(12) United States Patent
Brown

(10) Patent No.: US 6,543,337 B1
(45) Date of Patent: Apr. 8, 2003

(54) TOASTING DEVICE WITH BROWNING CONTROL

(75) Inventor: Paul Michael Brown, 10 Bishop's Road, Trumpington, Cambridge CB2 2NH (GB)

(73) Assignee: Paul Michael Brown (GB)

( * ) Notice: Subject to any disclaimer, the term of this patent is extended or adjusted under 35 U.S.C. 154(b) by 0 days.

(21) Appl. No.: 09/980,368

(22) PCT Filed: Jun. 5, 2000

(86) PCT No.: PCT/GB00/02047

§ 371 (c)(1),
(2), (4) Date: Feb. 25, 2002

(87) PCT Pub. No.: WO01/00073

PCT Pub. Date: Jan. 4, 2001

(30) Foreign Application Priority Data

Jun. 4, 1999 (GB) .............................................. 9912976

(51) Int. Cl.$^7$ .............................. A47J 37/08; H05B 1/02
(52) U.S. Cl. .......................... 99/327; 99/329 R; 99/331; 99/342; 99/385; 99/389; 99/391; 219/492; 219/521
(58) Field of Search ........................... 99/325–333, 341, 99/342, 337, 338, 385–391, 393; 219/411, 413, 345, 432, 490–494, 501, 514, 518, 521

(56) References Cited

U.S. PATENT DOCUMENTS

| 4,791,862 A | * | 12/1988 | Hoffmann .................... 99/385 |
| 4,976,194 A | | 12/1990 | Kelterborn et al. ........... 99/328 |
| 5,802,957 A | * | 9/1998 | Wanat et al. .................. 99/327 |
| 5,943,948 A | * | 8/1999 | Tanaka ........................ 99/388 |
| 6,112,648 A | * | 9/2000 | Origane .................... 99/391 X |
| 6,192,790 B1 | * | 2/2001 | Balandier .................... 99/390 |
| 6,262,406 B1 | * | 7/2001 | McKee et al. ............ 99/325 X |
| 6,267,044 B1 | * | 7/2001 | Friel, Sr. ..................... 99/327 |
| 6,311,608 B1 | * | 11/2001 | Hardin et al. ................. 99/326 |
| 6,341,554 B2 | * | 1/2002 | Thiriat ........................ 99/327 |

FOREIGN PATENT DOCUMENTS

| DE | 2616546 | 10/1977 |
| DE | 3424585 | 2/1985 |
| DE | 3842303 | 6/1990 |

* cited by examiner

*Primary Examiner*—Timothy F. Simone
(74) *Attorney, Agent, or Firm*—Lee, Mann, Smith, McWilliams, Sweeney & Ohlson

(57) ABSTRACT

The present invention relates to toasting devices for toasting food which automatically control the degree browning of food toasted within them. The present invention particularly relates to such toasters that use a sensor to sense some quality of the food being toasted.

16 Claims, 3 Drawing Sheets

TOASTING DEVICE WITH BROWNING CONTROL

Figure 1:
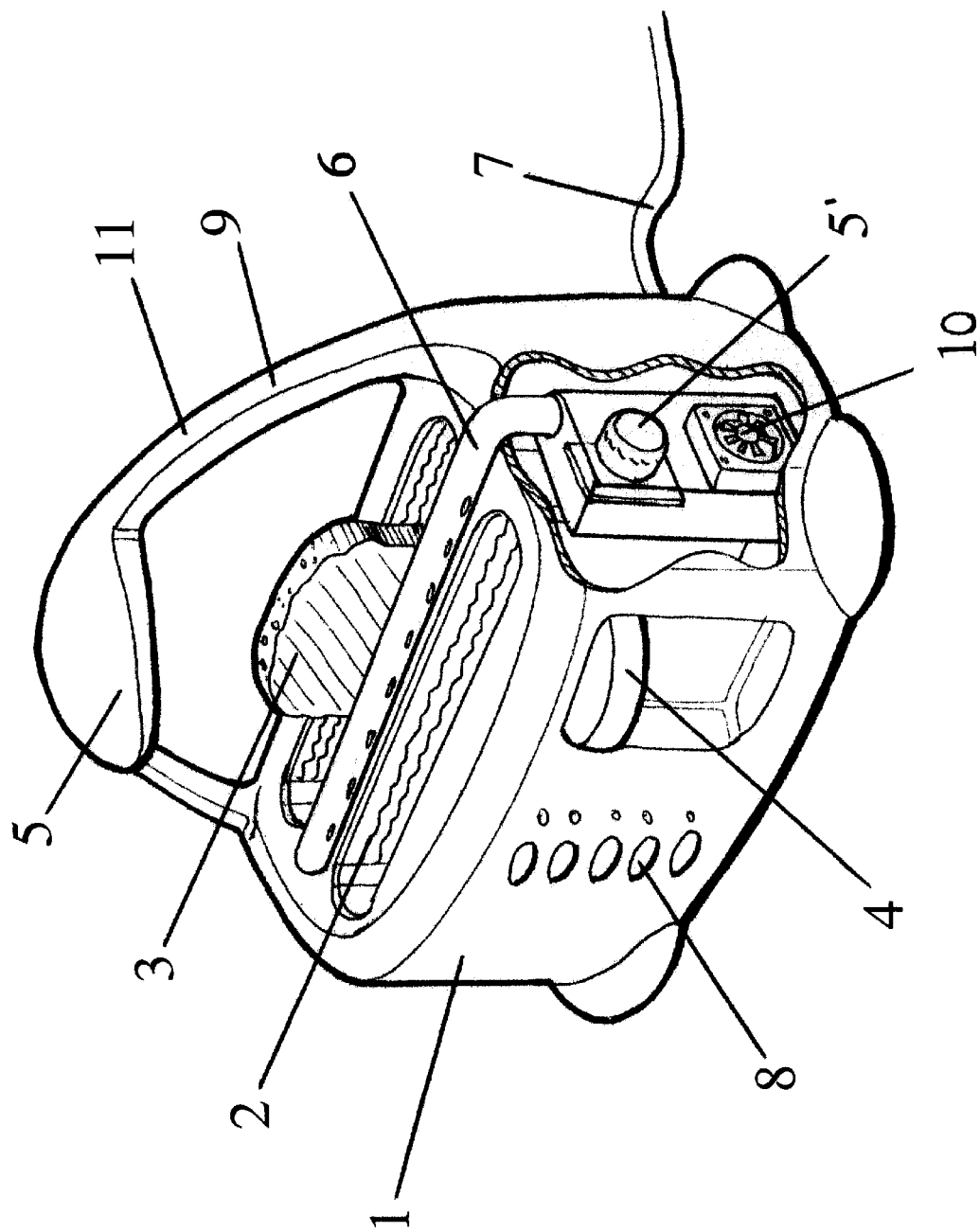

The present invention relates to toasting devices for toasting food which automatically control the degree of browning of food toasted within them. The present invention particularly relates to such toasters that use a sensor to sense some quality of the food being toasted.

Known techniques for controlling the level of browning of bread being toasted in a toaster include

- the use of thermostatic devices such as bi-metallic strip devices;
- the use of timing devices such as electronic timers;
- the use of temperature sensors to monitor the temperature of the food being toasted (for example, see GB-A-2 193 086);
- the use of optical devices which sense the colour of food as it is toasting, in conjunction with an electronic controller for stopping the toasting process (for example, see EP-A-0 033 642); and
- the use of electro-chemical sensors for sensing the quantities and qualities of certain gases being given off by the toasting food, in conjunction with an electronic controller for stopping the toasting process (for example, see DE-A-3 842 303).

A problem with the use of thermostatic, timing devices and temperature sensors is that these require an operator to guess at the time needed to reach an ideal browning of the food. If a variety of different foodstuffs are to be inserted into the toaster, each of which has different qualities such as moisture content, density and/or temperatures, the operator is unlikely to be able to set the timer to the correct setting except by experimenting and remembering the correct timing required for each particular foodstuff. An incorrectly set thermostat or timer results in under-toasted bread or burnt toast.

In order to toast frozen foodstuffs, some electronic toasters have a additional 'defrost' mode which extends the time of heating. One disadvantage of such prior art toasters is that a user must remember to select the defrost mode. Another disadvantage is that a user can still not be sure whether a frozen foodstuff will be over under-toasted.

A problem with the use of optical devices in sensing the colour of food being toasted is that it is a complex process and toasters which employ this technique suffer from the problems of being unreliable and overly expensive. It is also not always clear which particular part of a foodstuff, which is being toasted, needs to be 'looked at' by such optical devices.

A problem with sensing the gases coming off of food being toasted is that it involves the use of sensitive, specialised sensors.

Prior art toasters often suffer from problems that elements of the prior art toasters store heat after an initial toasting cycle and due to the manner in which prior art toasters are controlled this stored heat can lead to over-toasting of food in an immediately subsequent toasting cycle if a user does not change various settings on the toaster.

It would be desirable for a toaster to toast food correctly, independent of the toasting temperature and the type and temperature of food being toasted whilst using robust, readily available sensors.

Also known in the art are toasters, which incorporate an optical safety device, which sense smoke given off by food burning in the toaster and cutt-off the power supply to the toaster elements to prevent fire.

It is an object of the present invention to provide a toaster, which toasts food correctly, independent of the toasting temperature and the type and temperature of food being toasted.

It is further object of the present invention to provide a sensing means for such a toaster, which senses the degree of browning of food being toasted by an alternative method to those used in the prior art.

The present invention provides a toasting device comprising a particulate sensor for sensing particulates in the air in the vicinity of food being toasted in the toasting device and an electronic browning control means which controls the extent of browning of the food being toasted by controlling the length of time of toasting based on the output signal of the particulate sensor.

In one preferred embodiment, the particulate sensor comprises an ionisation chamber, an electrical-current sensing means and an electrical power source in an electrical sensing circuit, whereby particulates in the air in the vicinity of food being toasted are sensed due to such particulates causing a change in the current flowing through the electrical sensing circuit.

A toasting device according to the present invention can be used to toast a variety of food with different characteristics e.g. thin dry bread or frozen thick bread or other food stuffs (e.g. bagel, bun etc.) without a user having to alter any settings and to achieve a consistent level of browning for each one. Therefore no pre-guessing is required to achieve the desired level of toasting. The toasting device can be safely left to toast food without any worry of the food either under-toasting or burning.

The particulate sensor effectively senses qualities of the food being toasted and not the temperature of the toasting device itself. This means that a toasting device according to the invention is unaffected by elements of the toasting device storing heat after an initial toasting cycle.

The fact that a particulate sensor is being used for browning control in a toasting device according to the present invention has the additional benefit that no further fire-hazard fail-safe devices are required on the toasting device (such as an optical safety device as mentioned above).

Further aspects, advantages and objectives of the invention will become apparent from a consideration of the drawings and the ensuing description, which, by way of example, describe two embodiments of the invention in the forms of two bread toasters.

FIG. 1: Schematic diagram of a toasting device according to a first embodiment of the present invention with a particulate sensor over heating area FIG. 2: Schematic diagram of a toasting device according to a second embodiment of the present invention FIG. 3: A schematic diagram of an embodiment of a particulate sensor.

FIG. 1 shows a first embodiment of the invention. Such a toaster comprises a toaster housing (1) containing heating elements (2) and a mechanism for holding bread to be toasted and toast (3) including a rack and associated catch/release device which is activated by a lever (4). A particulate sensor (5) is mounted above or to the side (5') of the heating area. The particulate sensor is mounted on a support (9), which also serves as a conduit for electrical connections (11) between the particulate sensor and the electronic control system house within the toaster. The toaster is connected to the mains power by cable (7) and has controls (8) for choice of function and browning desired.

Figure 3:
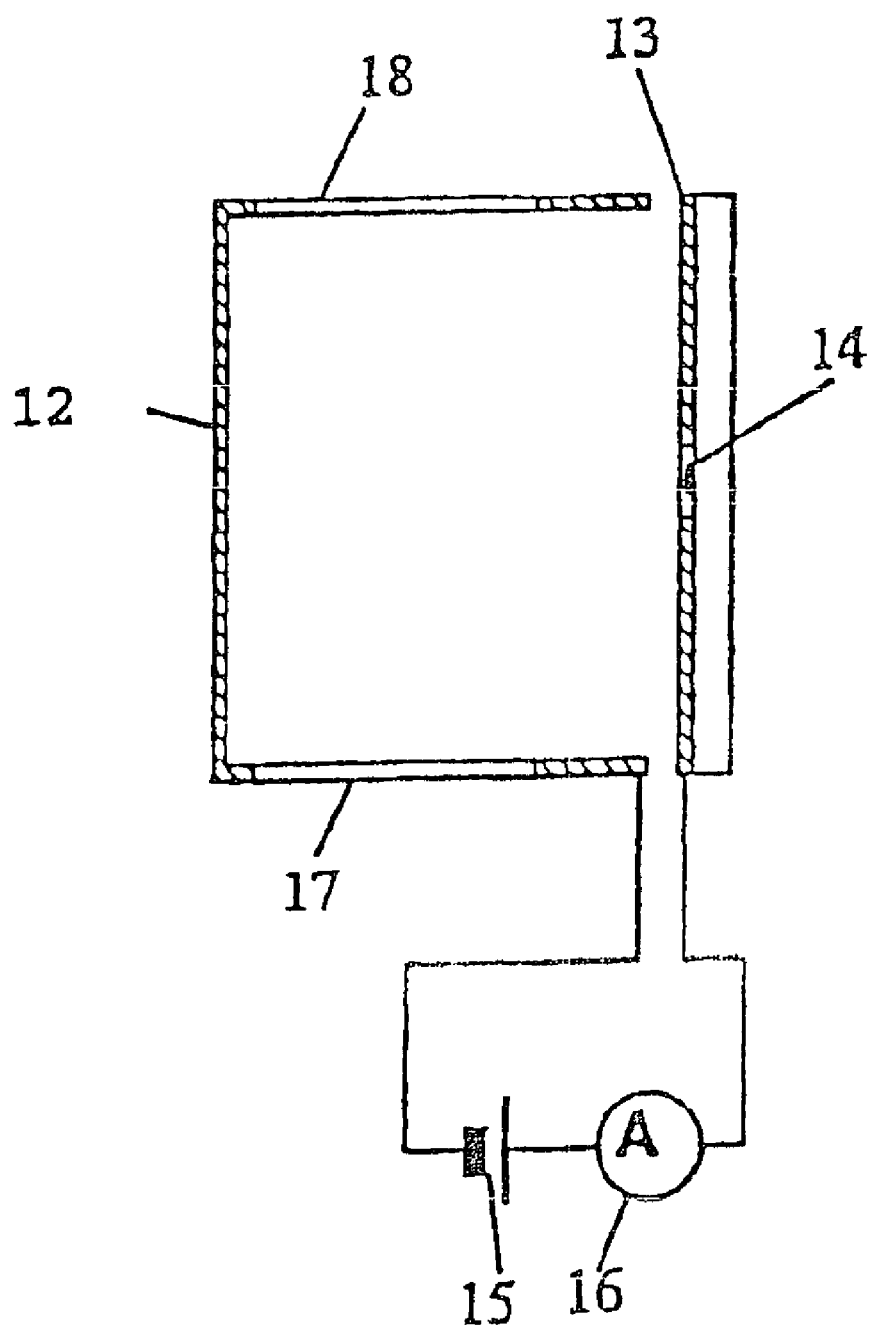

FIG. 3 shows an embodiment of an appropriate particulate sensor. The particulate sensor comprises an ionisation source (14), such as an alpha source, mounted on a plate, a flat, tauroidal anode (13) and a hollow, cylindrical cathode (12) forming an ionisation chamber. The hollow cylindrical cathode (12) has openings (17, 18) which allow particulates to enter an exit the ionisation chamber.

The anode (13) and cathode (12) are connected to an electrical circuit comprising the electrodes, a power source (15) and a current sensor (16) (e.g. ammeter, voltmeter etc.).

The alpha source (14) (e.g. Americiun) complete the electrical circuit by ionising the air inside the ionisation chamber. Any particles entering the ionisation chamber disrupt the flow of ions and cause a drop in current within the circuit and, hence are detected by the current sensor (16).

Thus particulates emanating from toasting products and entering the ionisation chamber cause a drop in current in the circuit which may be used to trigger the particulate sensor to output a signal.

Alternative embodiments of the particulate sensor (not shown) replace an alpha source with a circuit comprising a needle-like anode to create Autoionic emission or a needle-like cathode to create Autoelectric emission. These needle-like electrodes may be heated to increase the emission effects.

The particulate sensor may be positioned above the toasting product to allow convection currents to carry the particulates to the sensor.

Particulates are driven off the bread surface during the toasting process. Such particulates are driven off the bread surface by various effects including caramelisation of the starches and sugars in the bread, Maillard browning and burning of the bread. The fact that particulates are driven off before any burning of the bread/toast takes places is what allows the present invention to function as well as it does.

The particulate sensor maintains a standard level of browning. The particulate sensor is not sensitive to the early stages of the toasting process where moisture is driven off the bread's surface. Only after the majority of water has been driven off can the surface of the bread rise to the temperatures necessary for toasting to occur.

In operation, bread is inserted and toasted in a conventional manner. When the surface of the bread begins to toast the rising heated air carries particulates to the particulate sensor (5). The particulate sensor indicates the level of presence of particulates to the electronic control system. When a predetermined threshold level of presence of particulates is reached, the electronic control system terminates the toasting cycle. The predetermined threshold level may be either fixed at an appropriate value or it may be rendered adjustable by a user. The termination of the toasting cycle may be executed in a number of known ways such as firing a solenoid to release the catch/release device or by switching off an electromagnet etc.

The output signal of the particulate sensor (5) may be arranged to drive a display means or an audio signalling means which displays the current level of browning of the toast or which issues an audible signal respectively.

In alternative embodiments, the toaster has the particulate sensor mounted away from most of the heat generated by the toaster, but fed by an air sampler tube. This embodiment works in the same manner as the first embodiment, but with the sensor mounted away from the heat. Alternatively, an air sampler tube (6) or channel may be used in conjunction with an air moving means such as a fan (10) which sucks or blows air and particulates away from the vicinity of the toast through the air sampler tube or channel.

Figure 2:
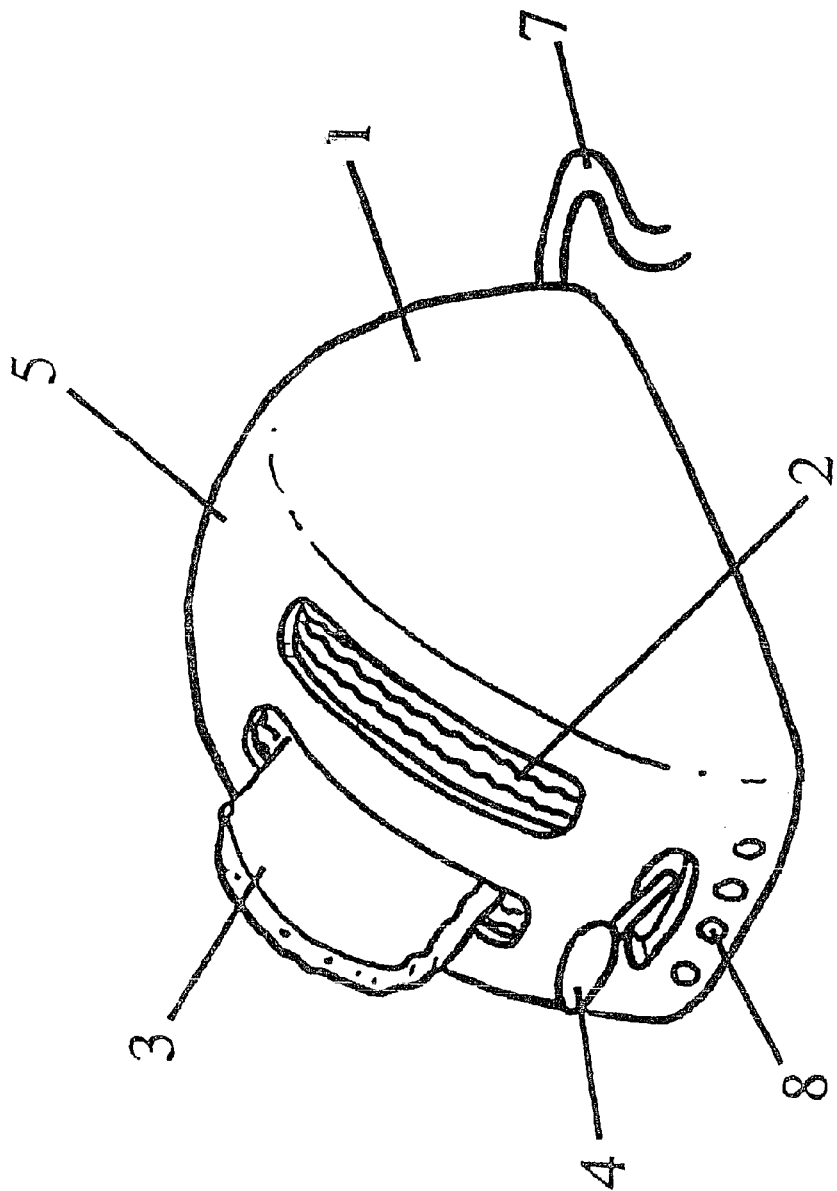

FIG. 2 shows a second embodiment of a toaster employing the invention in which the reference numerals have the same meaning as in FIGS. 1 and 3. In this embodiment the toast (3) is held in an angled slot. The mechanism for holding the toast is angled to allow the toast to be lowered into the slot. This allows the particulate sensor (5) to be mounted above the toast in order to allow easy flow of the suspended particulate to the sensor.

In an alternative embodiment (not shown) an air moving means such as a fan is used to such air down to the base of the toaster or across to one side or end of the toaster and direct the air and particulates to the particulate sensor mounted below or to the side or end of the toasting mechanism. This embodiment avoids the need for a support assembly (9) above the toaster.

Since the particulate sensor also senses the by-products of burning, as an additional benefit, a toaster according to invention also acts to prevent burning of toast and the fire hazards accompanied with such burning. The invention can be embodied using existing low cost technologies (e.g. an appropriately tuned ionisation smoke detector as a particulate sensor).

The particulate sensor area may be kept clean by directing the airflow (in those embodiments employing an air moving means such as a fan) so that particulates cannot settle on the sensing surfaces. Alternatively, a cleaning mechanism can be provided that automatically cleans the sensing surfaces, for instance every time the rack holding the food is pushed down/or released.

I claim:

1. A toasting device comprising a particulate sensor for sensing particulates in the air in the vicinity of food being toasted in the toasting device and an electronic browning control means which controls the extent of browning of the food being toasted by controlling the length of time of toasting based on the output signal of the particulate sensor.

2. A toasting device according to claim 1 in which the particulate sensor comprises an ionisation chamber, an electrical-current sensing means and an electrical power source in an electrical sensing circuit, whereby particulates in the air in the vicinity of food being toasted are sensed due to such particulates causing a change in the current flowing through the electrical sensing circuit.

3. A toasting device according to claim 2 which further comprises at least one radioactive source which causes the ionisation effects.

4. A toasting device according to claim 2 which further comprises at least one autoionic emission source which causes the ionisation effects.

5. A toasting device according to claim 2 which further comprises at least one autoelectric emission source which causes the ionisation effects.

6. A toasting device according to claim 1 in which the length of time of toasting is controlled by controlling the time at which a catch/release device is released.

7. A toasting device according to claim 1 in which the length of time of toasting is controlled by controlling the time at which the heater element is switched off.

8. A toasting device according to claim 1 in which toasting is ended when the output signal of the particulate sensor passes a predetermined threshold level.

9. A toasting device according to claim 8 in which the predetermined threshold level is variable.

10. A toasting device according to claim 1 in which toasting is ended a predetermined amount of time after the output signal of the particulate sensor passes a predetermined threshold level.

11. A toasting device according to claim 1 in which the output signal of the particulate sensor is used to drive a display means which displays the level of browning of food in a toasting device.

12. A toasting device according to claim 1 in which the particulate sensor is mounted above an area in which food is toasted, whereby air and particulates are carried to the particulate sensor by the rising of heated air.

13. A toasting device according to claim 1 in which the food being toasted is loaded into and removed from the toasting device from the sides or bottom of the toasting device.

14. A toasting device according to claim 1 in which the particulate sensor is mounted beside or below an area in which food is toasted and an air moving means is provided which moves air and particulates towards the particulate sensor.

15. A toasting device according to claim 1 in which an air sampler tube or channel is provided to direct air and particulates towards the particulate sensor.

16. A toasting device according to claim 1 further comprising a cleaning mechanism which cleans the particulate sensor each time a piece of food is loaded into and/or removed from the toasting device.

* * * * *